(12) United States Patent
Fujii

(10) Patent No.: US 6,287,560 B1
(45) Date of Patent: Sep. 11, 2001

(54) AUDIO OR IMAGE PROCESSING SYSTEM

(75) Inventor: Hiroko Fujii, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/526,732

(22) Filed: Mar. 16, 2000

(30) Foreign Application Priority Data

Mar. 17, 1999 (JP) .................................................. 11-072723

(51) Int. Cl.[7] .................................................. G09B 19/00
(52) U.S. Cl. .................... 424/127; 434/308; 434/319; 434/428; 463/35; 446/481; 446/14
(58) Field of Search .............................. 463/35; 434/127, 434/308, 382, 148, 150, 151; 446/148, 150, 151

(56) References Cited

U.S. PATENT DOCUMENTS

| | | | | |
|---|---|---|---|---|
| 4,333,258 | * | 6/1982 | McCaslin | 46/14 |
| 4,467,553 | * | 8/1984 | Kanda | 446/136 |
| 4,515,359 | * | 5/1985 | Mariol | 272/1 R |

* cited by examiner

Primary Examiner—Jessica J. Harrison
Assistant Examiner—Alex F. R. P. Rada, II
(74) Attorney, Agent, or Firm—Finnegan, Henderson, Farabow, Garrett & Dunner, L.L.P.

(57) ABSTRACT

Provided is an audio or image processing system capable of realizing virtual cooking such that a child may comprehensively enjoy and learn cooking in general while following the cooking steps. The audio or image processing system to be used for playing a game of virtual cooking comprises a plurality of input devices for respectively conducting different forms of virtual cooking, and an audio or image processing device for performing audio or image processing corresponding to the respective input devices based on data input therefrom and outputting the result thereof to an output playback device.

36 Claims, 16 Drawing Sheets

AUDIO OR IMAGE PROCESSING SYSTEM

BACKGROUND OF THE INVENTION

1. Field of the Invention

The present invention generally relates to an audio or image processing system to be used for playing a game of virtual cooking. Particularly, this invention relates to an audio or image processing system for realizing virtual cooking by performing audio or image processing corresponding to the respective input devices based on data input therefrom, and outputting the results thereof to an output playback device.

2. Description of the Related Art

Conventionally, there have been various cooking toys imitating cooking utensils and ingredients to be used as toys for virtual cooking upon playing house and so on.

As cooking toys with a burner, for example, there are those that simulate a flame by emitting light using an LED, or achieve the ambience of cooking by generating cooking sounds with a built-in audio generating device. There are also: types which resort to artifice of making ingredients, such as vegetables, fruits, meat, and so on, to be separable, and imitate the cutting of ingredients upon a user pretending to cut these ingredients with a toy knife.

In recent years, utilized as intellectual training toys for children are audio or image processing systems which perform prescribed audio or image processing pursuant to data input from an input device, and display the result to, for example, an output playback device such as a TV. As an example of this type of intellectual training toy, there are those in which pictures and characters drawn on a tablet with a touch pen as the input device are displayed on the aforementioned output playback device. There are also types in which a user may become familiar with traffic rules by using input devices imitating a steering wheel and gearshift of a car to conduct virtual driving while operating such steering wheel and gearshift and viewing the image displayed on the output playback device.

Nevertheless, the aforementioned cooking toy with a burner has a problem in that when a pot or frying pan is placed thereon, the LED simulating the flame is hidden at the bottom of the cooking utensil and the simulation effect is decreased thereby. Moreover, cooking toys that generate cooking sounds have a problem in that the sound produced, for example, is merely a simple frying sound and thereby lacks ambience. Furthermore, conventional cooking toys also have a disadvantage in that the arrangement of the respective switches is often a miscellany, which frequently led to erroneous operations In addition, among the intellectual training toys for children utilizing an audio or image processing system, the actual situation is that a so-called system kitchen with a burner, cutting board, faucet, sink, etc., which enables a child to comprehensively enjoy and learn cooking in general, has not been provided heretofore.

SUMMARY OF THE INVENTION

Accordingly, the present invention was devised in order to overcome the aforementioned conventional problems and an object thereof is to provide an audio or image processing system capable of realizing virtual cooking such that a child may comprehensively enjoy and learn cooking in general while following the cooking steps.

In order to achieve the aforementioned object, the present invention provides an audio or image processing system to be used for playing a game of virtual cooking, comprising: a plurality of input devices for respectively conducting different forms of virtual cooking; and an audio or image processing device for performing audio or image processing corresponding to the respective input devices based on data input therefrom and outputting the result thereof to an output playback device.

The audio or image processing system having the aforementioned structure is capable of realizing virtual cooking such that a child may comprehensively enjoy and learn cooking in general while following the cooking steps. If data is input only from a single input device, independent virtual cooking in accordance with the respective input devices; for example, frying, cutting, washing, etc., is possible.

The audio or image processing device is capable of performing the audio or image processing in accordance with the interval between a first signal input from the respective input devices and a second signal input subsequent to the first signal.

According to this structure, for example, the virtual cooking time and the timing of cooking will change, and the result of the virtually cooked dish is output in a realistic manner.

The respective input devices may be arranged integrally and at least two of the input devices may be arranged to be at different heights in order to avoid the input operations to the respective input devices from interfering with each other.

According to this structure, prevented is the occurrence of erroneous inputs to the respective input devices.

At least one of a plurality of input devices may comprise a vibration mechanism for generating vibrations based on the interval of the first signal and second signal.

The input device comprising the vibration mechanism may be a burner-shaped input device imitating a burner, and in addition to providing vibration to the cooking utensil placed thereon, it may conduct the on/off of input pursuant to the existence of the cooking utensil and maintain the "on" state while the cooking utensil is placed thereon.

According to this structure, the cooking utensil itself is vibrated in accordance with the time which the cooking utensil is placed on the burner-shaped input device. Therefore, realistic cooking is approximated and ambience i's improved thereby.

The input device comprising the vibration mechanism may have an engaging member for engaging with the cooking utensil, and a reception for engaging with the engaging member may be formed on such cooking utensil.

According to this structure, even if the cooking utensil is vibrated pursuant to the vibration mechanism, prevented is such cooking utensil sliding or falling from the burner-shaped input device.

Either the engaging member or the reception may be formed of a concave portion, while the other may be formed of a convex portion.

One of a plurality of input devices may be arranged in a position where the fulcrum of input is displaced from the center thereof.

The input device with a displaced fulcrum of input may be a cutting board-shaped input device imitating a cutting board, and a concave portion may be formed at the approximate center of the upper face thereof for indicating the position of placing the ingredient.

According to this structure, input signals will be difficult to input to the cutting board-shaped input device when an end portion near the fulcrum of input or the approximate center thereof is pushed. That is, input of input signals is prevented upon such acts of placing the virtual ingredient on the concave portion of the cutting board-shaped input device or accompanying the hand on the placed ingredient. Meanwhile, input signals will be input smoothly when an end portion far from the fulcrum of the input is pushed. In other words, as input signals will be input smoothly upon cutting the ingredients, prevented is input of signals different therefrom. Further, by the provision of the concave portion, ingredients may be placed thereon, and additionally prevented is the erroneous input of input signals.

One of a plurality of input devices may change input signals in stages.

The input device for changing input signals in stages may control the vibration of the input device comprising the vibration mechanism.

The input device for changing input signals in stages may be a burner control knob-shaped input device imitating a knob for adjusting the heating power of the virtual burner.

According to this structure, the thoroughness of cooking the ingredient can be changed by designating the adjustment; for example, off, low, medium, high, etc., of the burner control knob-shaped input device. Further, the thoroughness of cooking the ingredient can be changed in accordance with the time the knob remains at the designated position. Thus, reproduced is cooking in a further realistic manner.

One of a plurality of input devices may be a faucet lever-shaped input device imitating a faucet lever for discharging and stopping water of a virtual water supply.

The faucet lever-shaped input device may comprise an urging member for urging the lever in a reverse direction to that of the input operation direction so as to return the lever to the original position after each input operation.

According to this structure, the user may make an input by moving the faucet lever-shaped input device only in one direction, for example, from up to down, and the operation is simplified thereby.

The faucet lever-shaped input device may be arranged behind the cutting board-shaped input device and placed in a position higher than that of the cutting board-shaped input device.

According to this layout, it will be easier to cut the ingredients. Moreover, accidentally touching the cutting board-shaped input device will be reduced upon operating the faucet lever-shaped input device, and erroneous inputs of input signals may thereby be prevented.

The audio or image processing device may control the cutting style of the ingredients of virtual cooking in accordance with the interval between the first signal and second signal input from the cutting board-shaped input device.

The audio or image processing device may control the thoroughness of cooking the ingredients of virtual cooking inn accordance with the interval between the first signal and second signal input from the burner control knob-shaped input device.

The audio or image processing device may control the amount of water of the virtual water supply in accordance with the interval between the first signal and second signal input from the faucet lever-shaped input device.

One of a plurality of input devices may be structured of a selection button for selecting the contents of the menu displayed on the output playback device, and a decision button for deciding the contents selected with such selection button.

The selection button and decision button may be arranged at a lower position than that of the burner-shaped input device, cutting board-shaped input device, and faucet lever-shaped input device.

The respective input devices may be integrally arranged on a single virtual kitchen table, and the virtual kitchen table may be made to be attachable to and detachable from the audio or image processing device.

The present invention further provides an input system arranging one of the respective input devices to a single housing.

The present invention further provides a peripheral of an audio or image processing system to be used for playing a game of virtual cooking comprising an input device, and an audio or image processing device for performing audio or image processing corresponding to the respective input devices based on data input therefrom and outputting the result thereof to an output playback device, wherein the input device comprises a shape imitating a burner, conducts the on/off of input pursuant to the existence of a cooking utensil, and inputs data corresponding to the time the cooking utensil is placed on the burner to the audio or image processing device.

The peripheral may further comprise a vibration mechanism for generating vibrations corresponding to the time the cooking utensil is placed on the burner.

The peripheral may further comprise a second input device for inputting signals for adjusting the heating power of the virtual burner.

The present invention further provides a peripheral of an audio or image processing system to be used for playing a game of virtual cooking comprising an input device, and an audio or image processing device for performing audio or image processing corresponding to the respective input devices based on data input therefrom and outputting the result thereof to an output playback device, wherein the input device comprises a shape imitating a cutting board and is arranged in a position where the fulcrum of input is displaced from the center thereof.

The present invention further provides a peripheral of an audio or image processing system to be used for playing a game of virtual cooking comprising an input device, and an audio or image processing device for performing audio or image processing corresponding to the respective input devices based on data input therefrom and outputting the result thereof to an output playback device, wherein the input device comprises a shape imitating a faucet lever for discharging and stopping water of a virtual water supply and has an urging member for urging the lever in a reverse direction to that of the input operation direction so as to return the lever to the original position after each input operation.

The present invention further provides a recording medium for realizing the audio or image processing system mentioned above.

The present invention further provides an audio or image processing system comprising: an overall input device having arranged thereon a plurality of input devices capable of inputting in different forms; and an audio or image processing device for performing audio or image processing corresponding to the respective input devices based on data input therefrom and outputting the result thereof to an output playback device, wherein with respect to the overall input device, a plurality of input devices are arranged in a row racing the front of the operator, and the input devices on the distal end of the operator is formed at a position higher than that of the input devices on the proximal end of the operator.

DESCRIPTION OF THE PREFERRED EMBODIMENT

An example of the audio or image processing system for conducting virtual cooking pertaining to the embodiment of the present invention is now explained with reference to the attached drawings.

Figure 1:
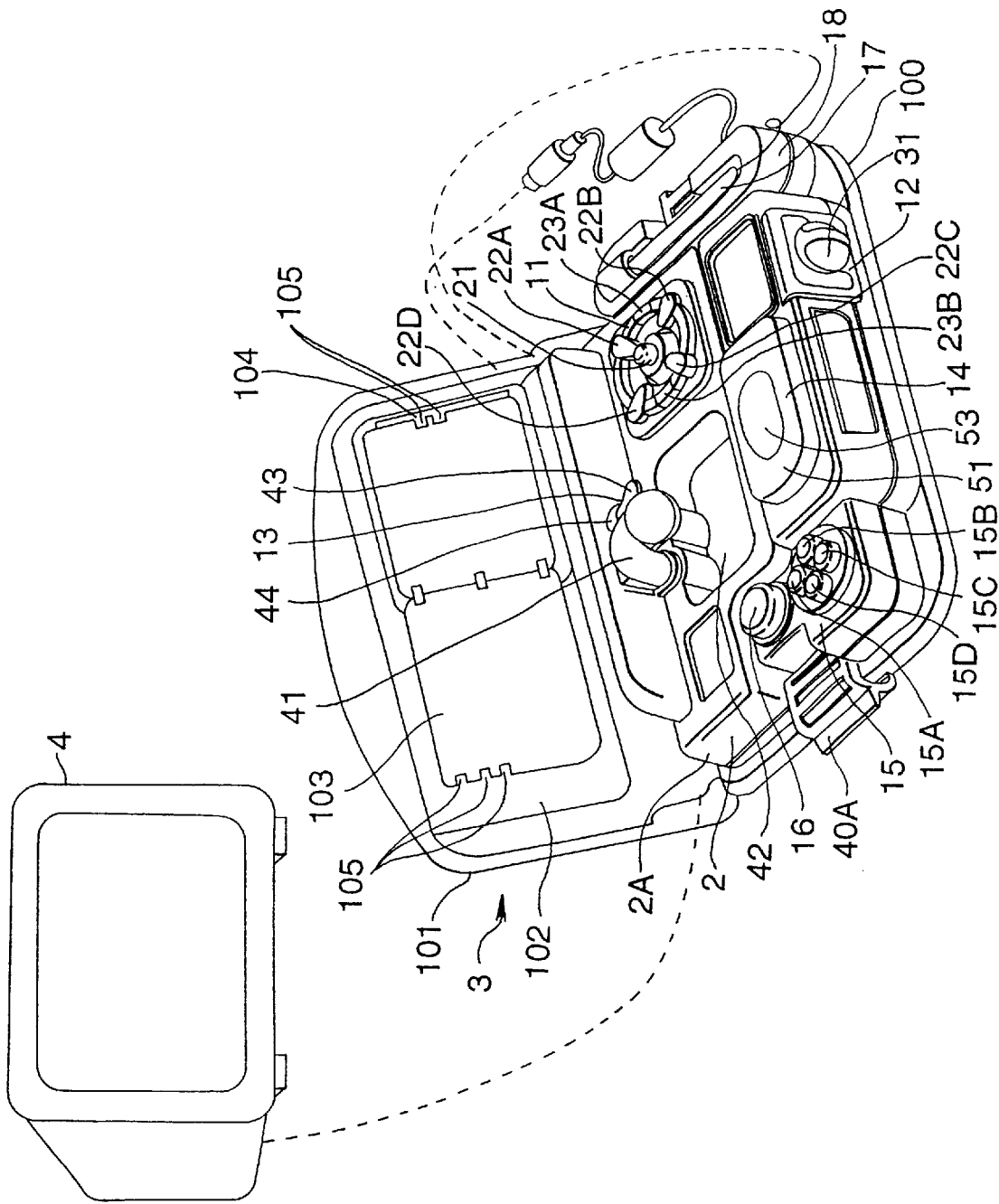
FIG. 1 is a perspective view showing the state where the audio or image processing device according to the embodiment of this invention is connected to the output playback device.
Figure 2:
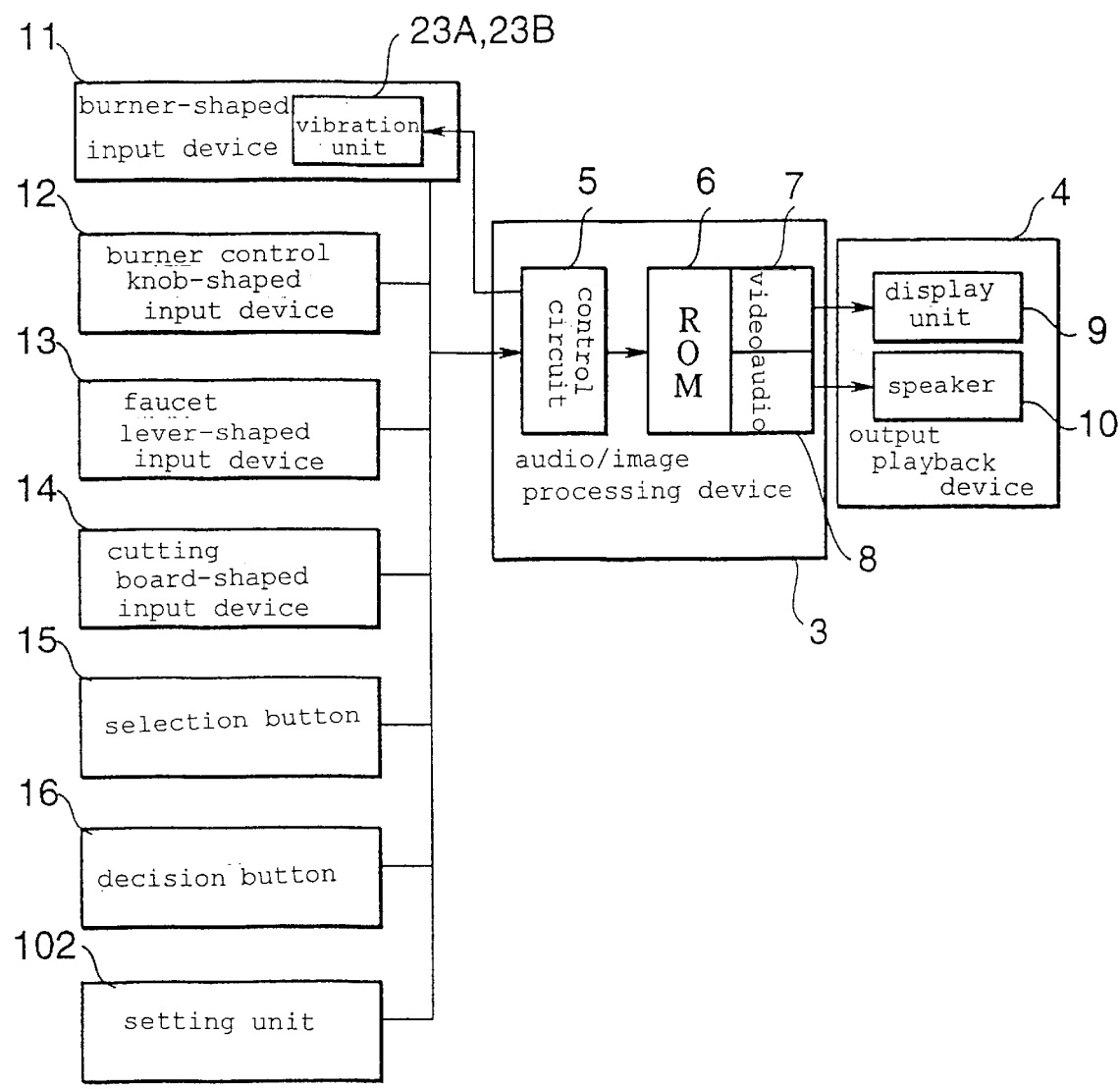
FIG. 2 is a block diagram showing the state where the audio or image processing device according to the embodiment of this invention is connected to the output playback device.
Figure 3:
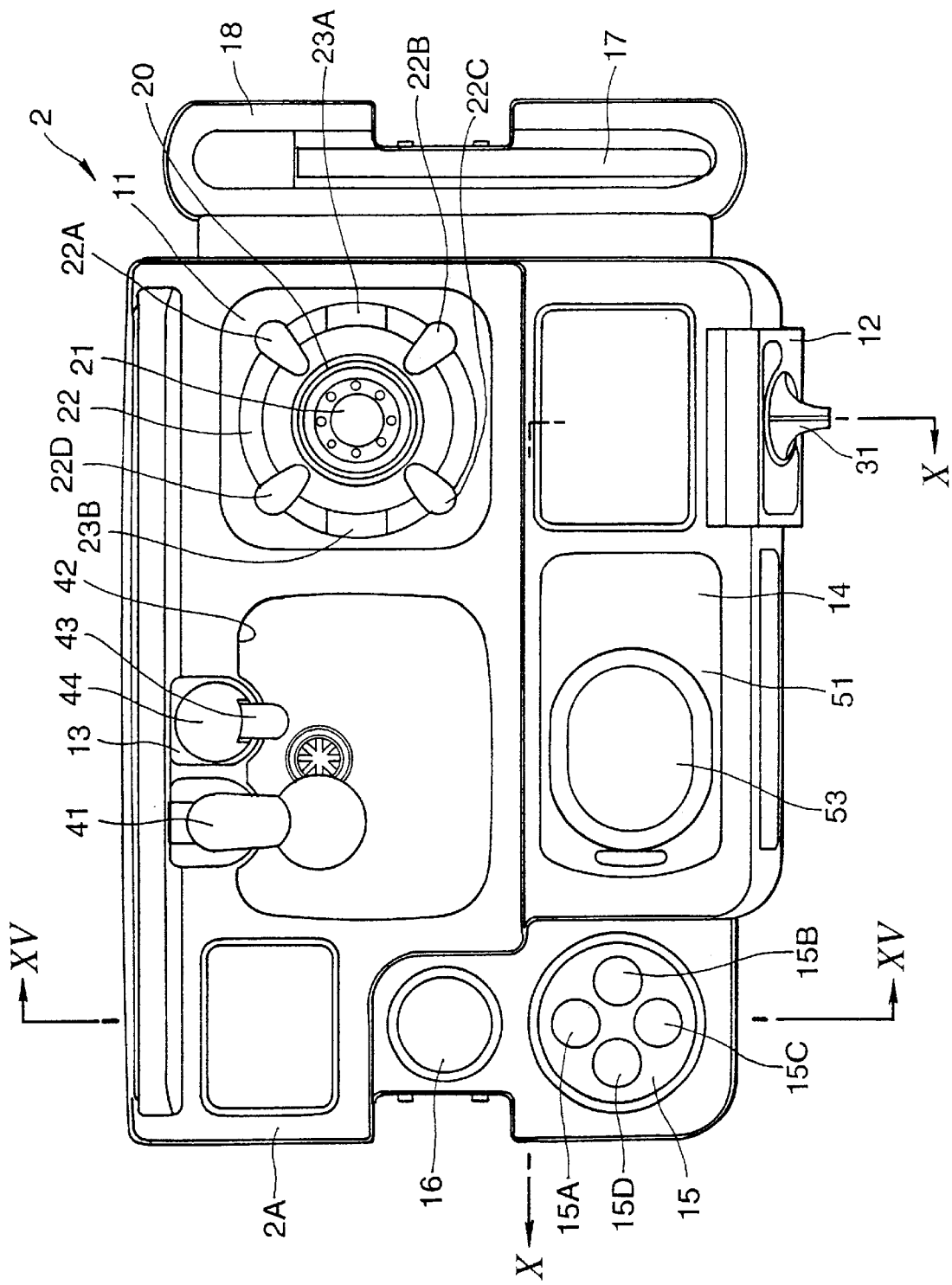
FIG. 3 is a plan view showing the input system according to the embodiment of this invention.
Figure 4:
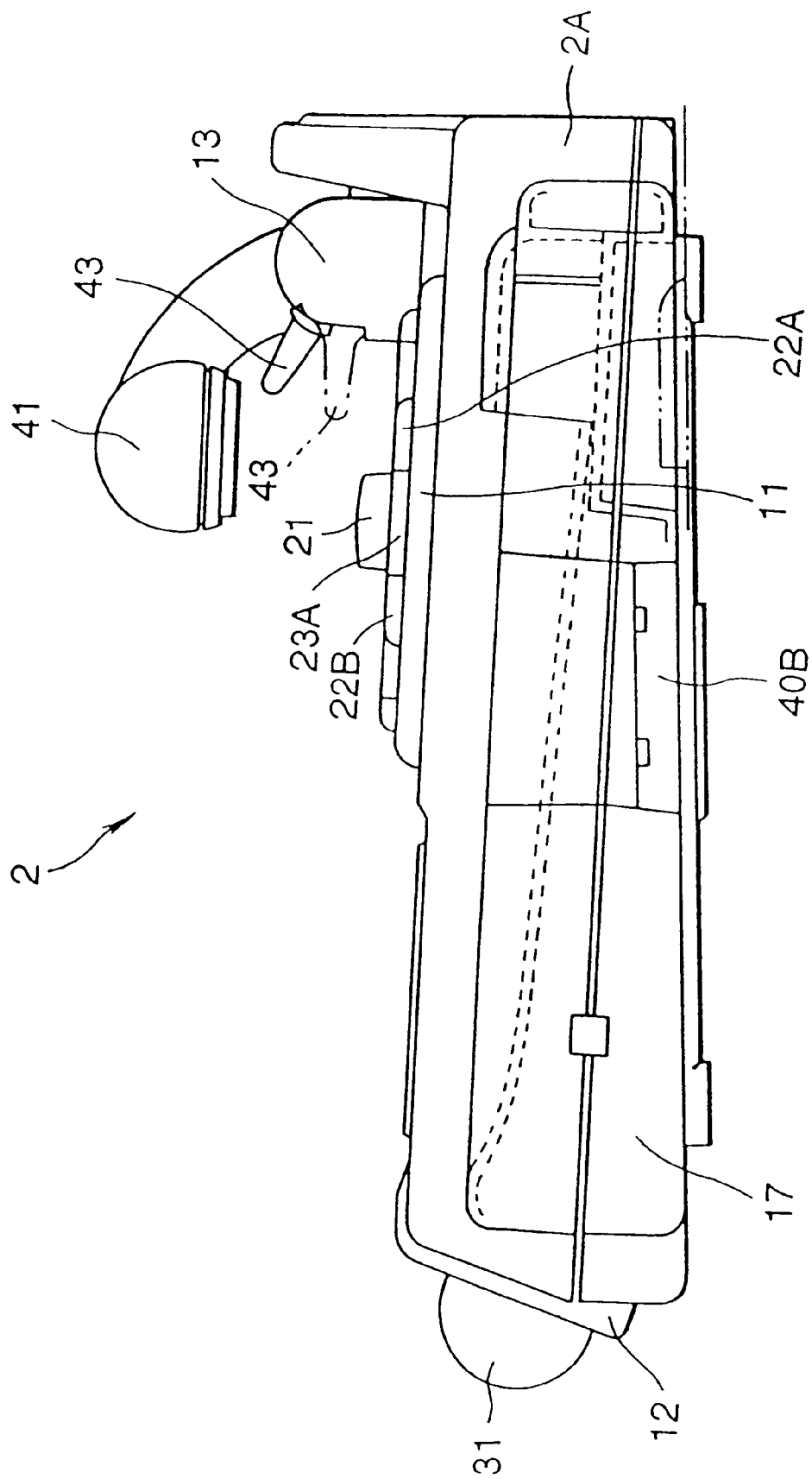
FIG. 4 is a right side view of the input system of FIG. 3.
Figure 5:
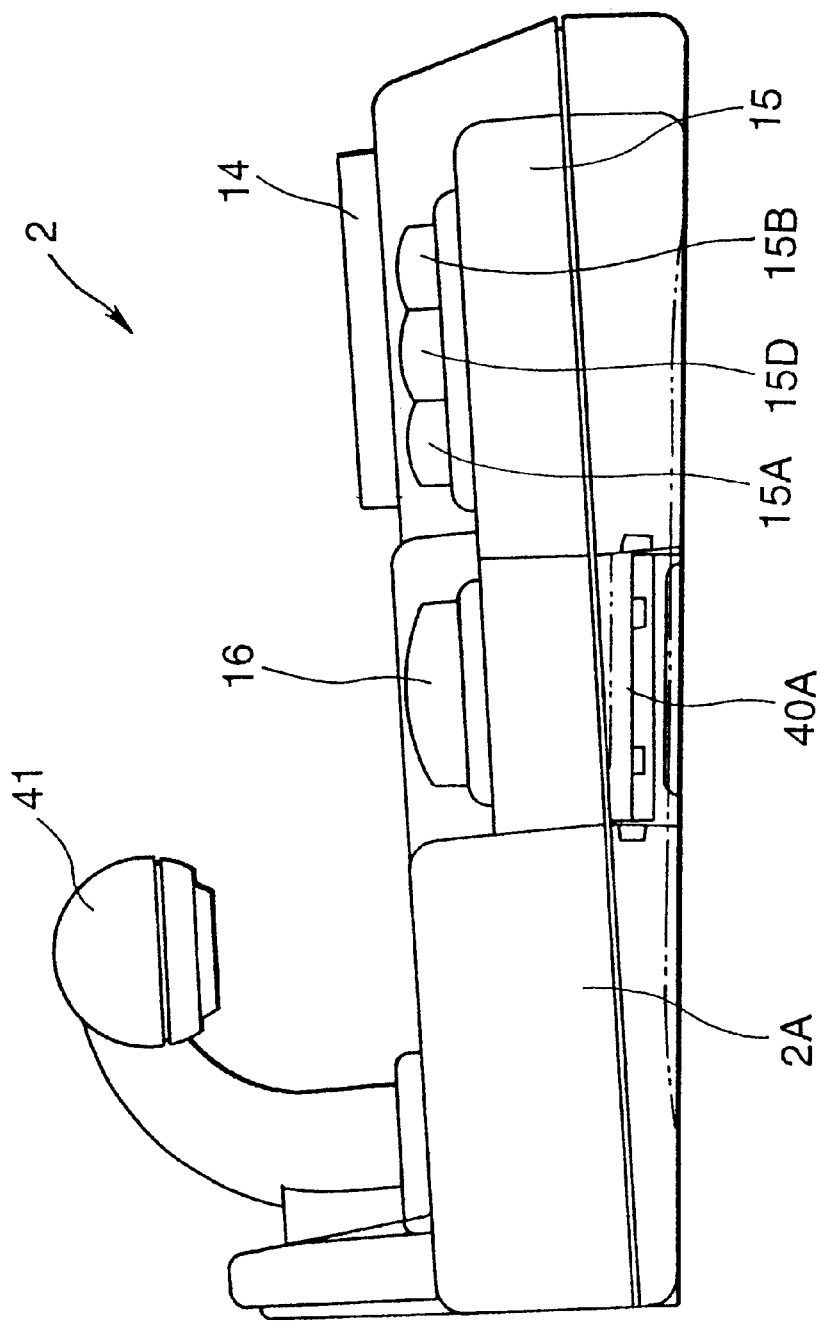
FIG. 5 is a left side view of the input system of FIG. 3.
Figure 6:
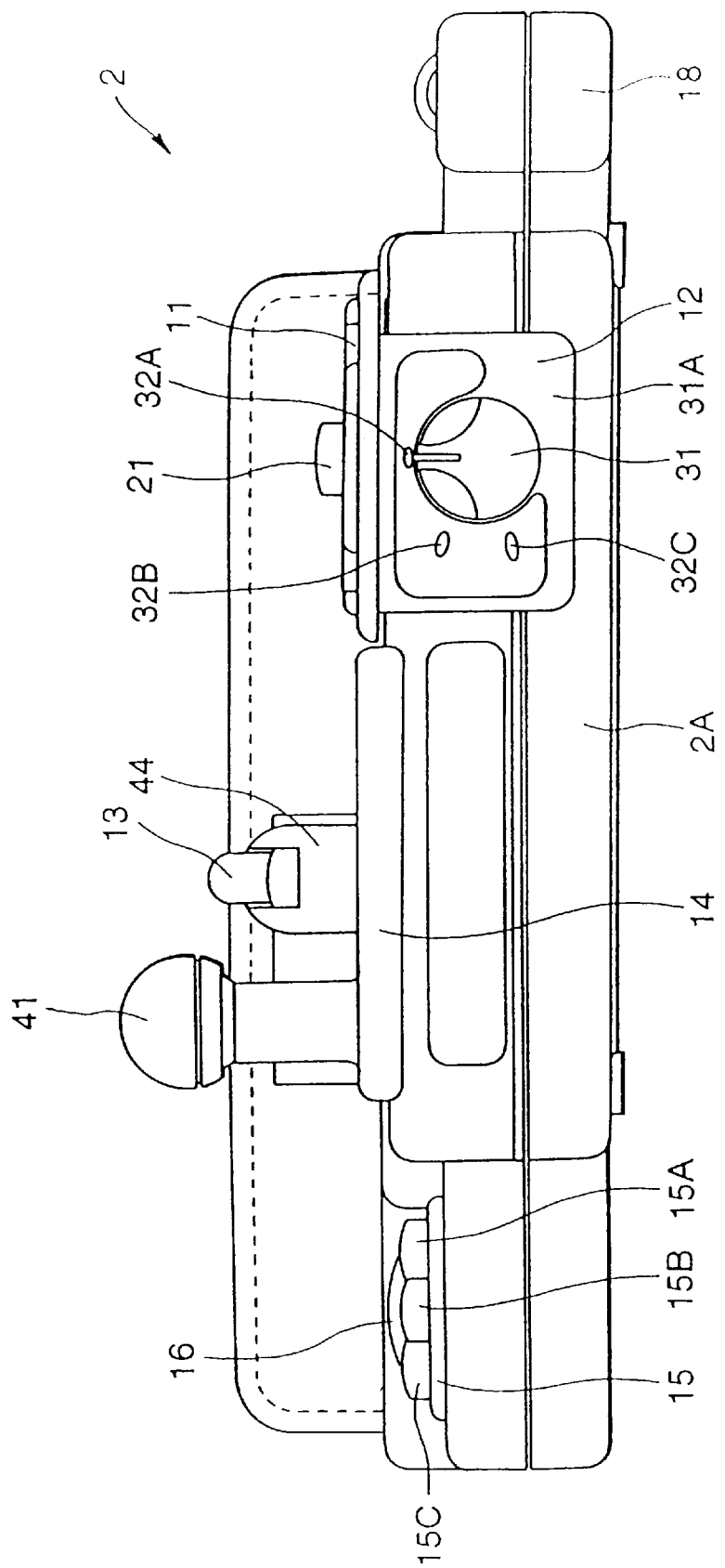
FIG. 6 is a front view of the input system of FIG. 3.
Figure 7:
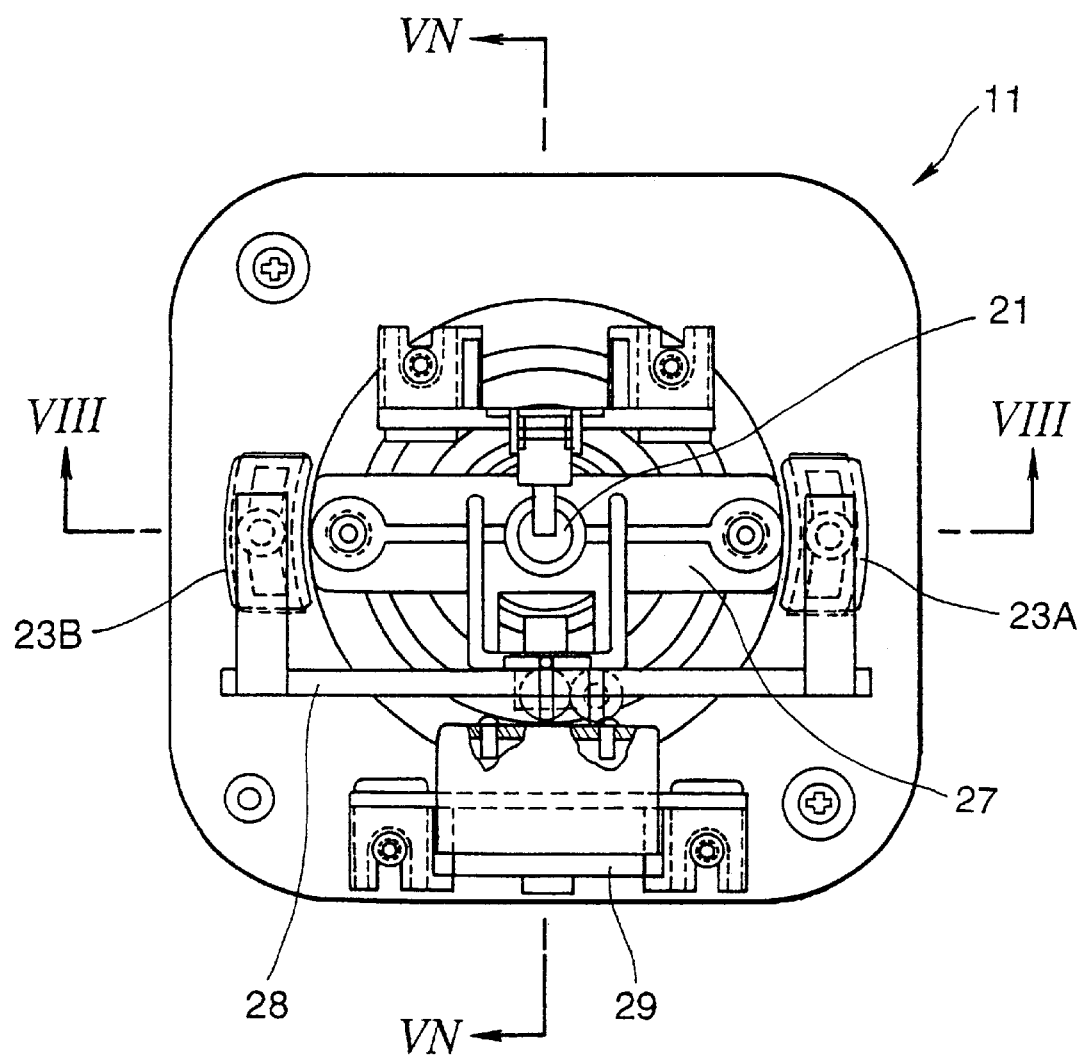
FIG. 7 is a plan view showing the state where the burner grate of the burner-shaped input device according to the embodiment of this invention has been removed.
Figure 8:
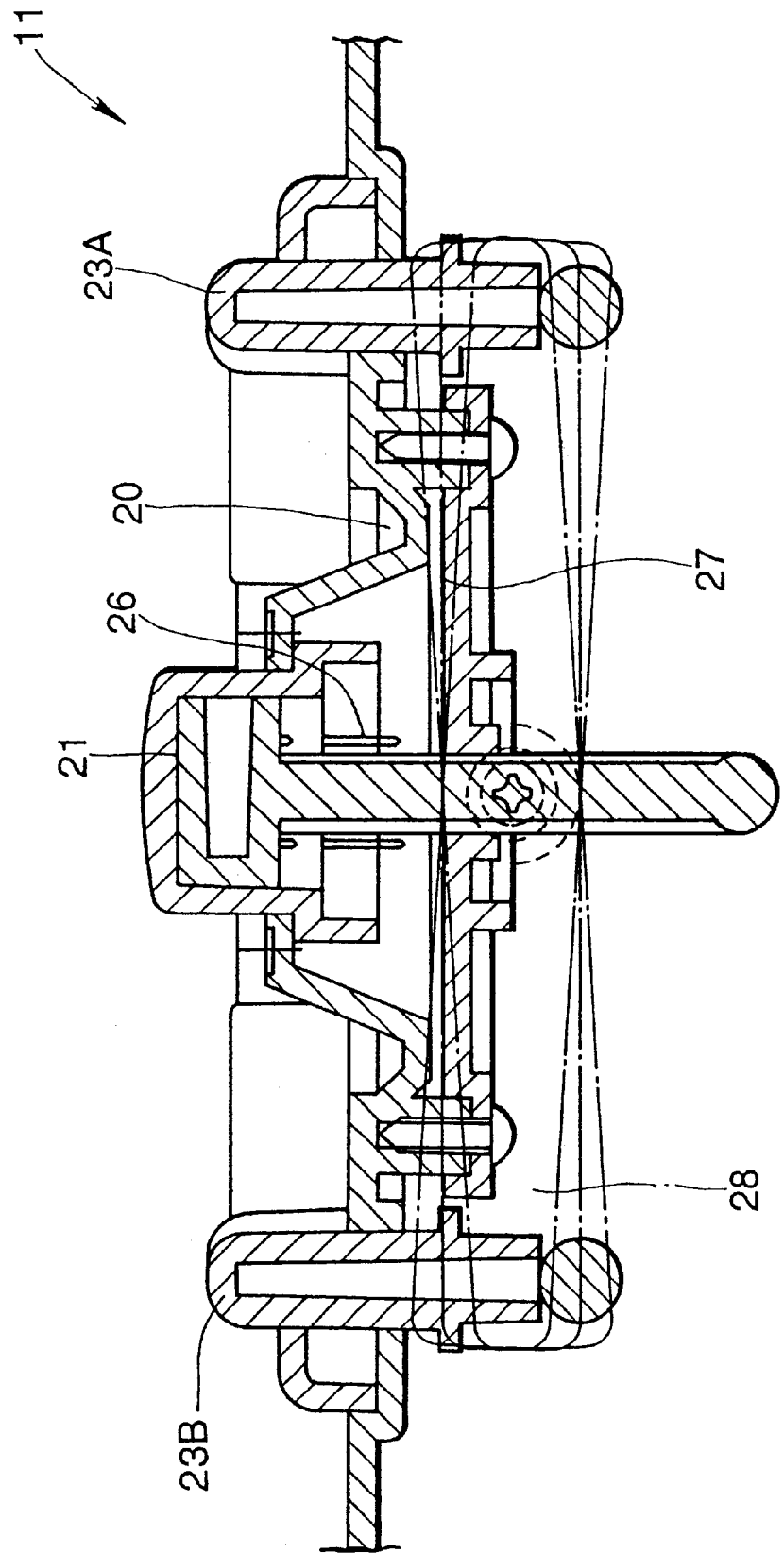
FIG. 8 is a cross section along line VIII—VIII shown in FIG. 7.
Figure 9:
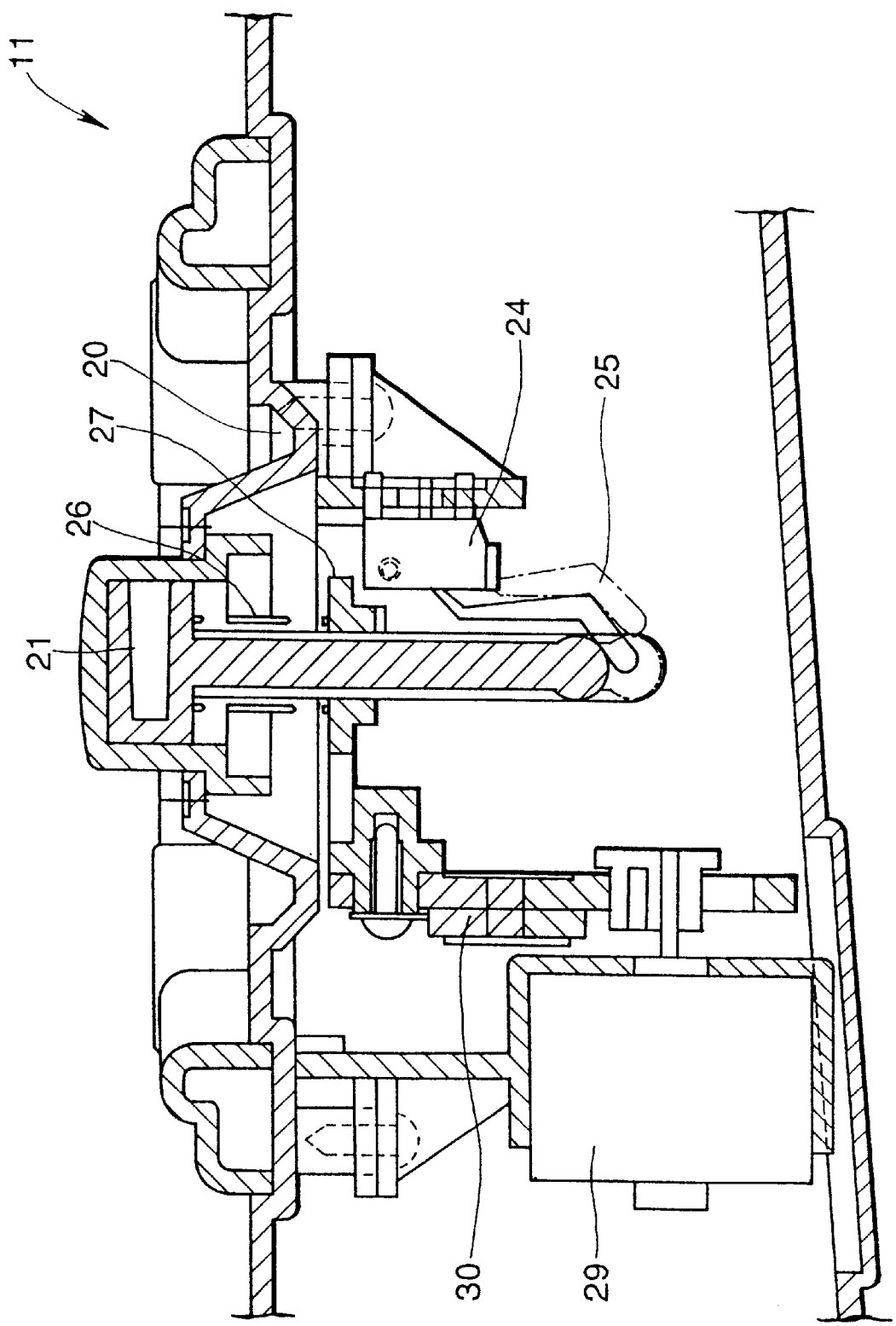
FIG. 9 is a cross section along line VN—VN shown in FIG. 7.
Figure 10:
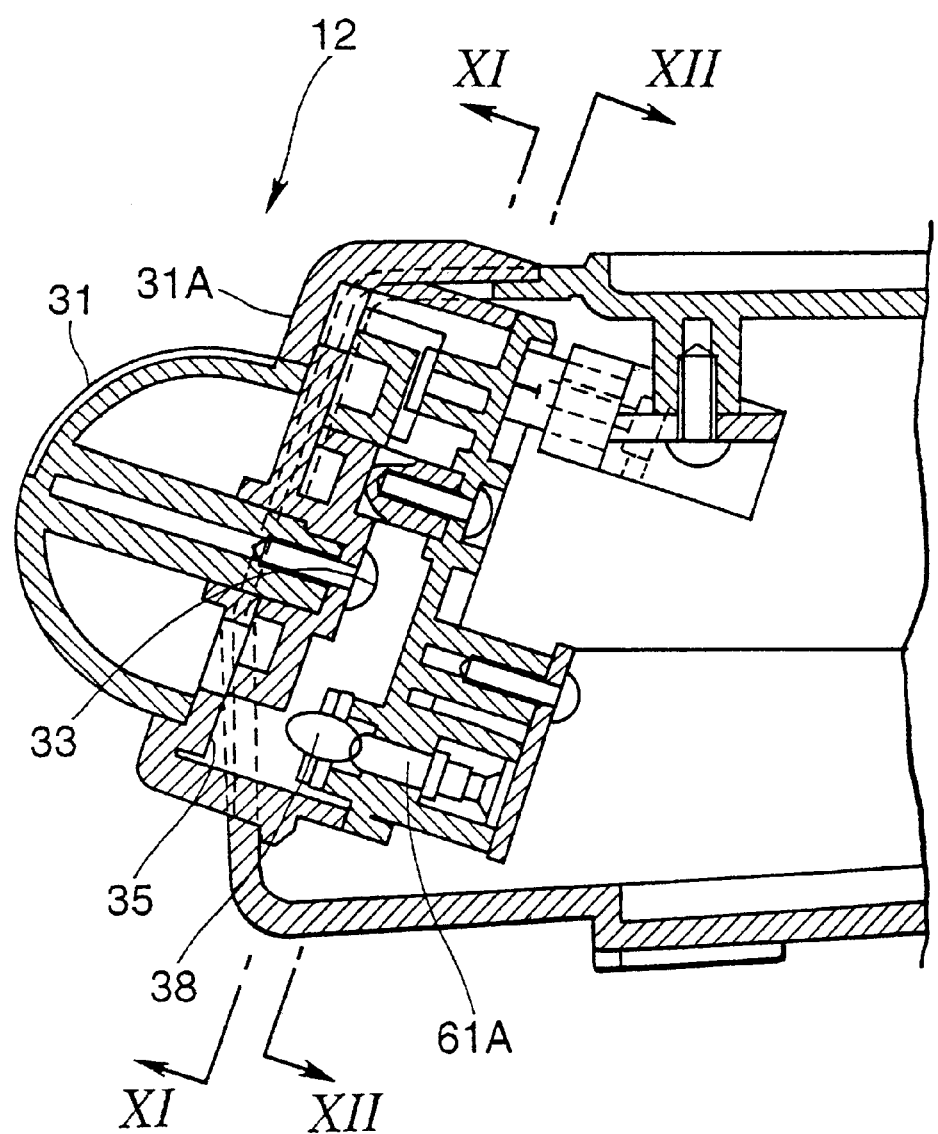
FIG. 10 is a cross section along line X—X shown in FIG. 3.
Figure 11:
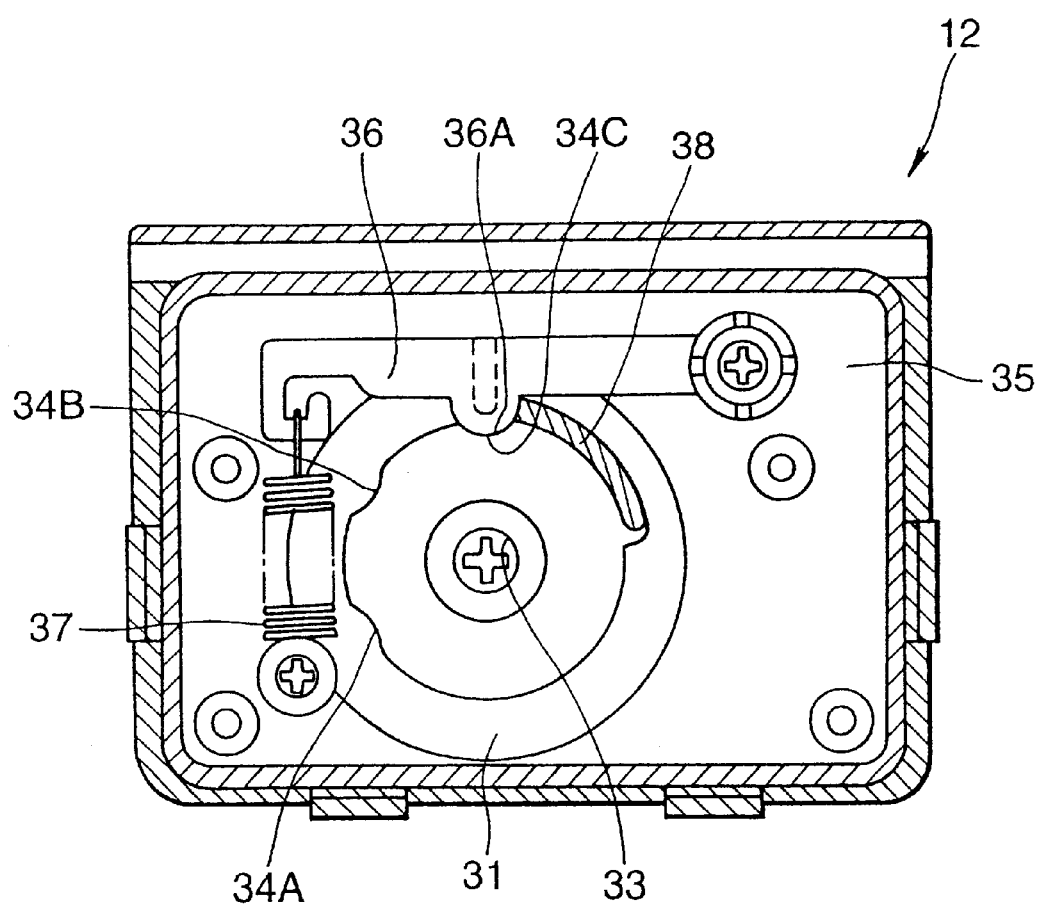
FIG. 11 is a cross section along line XI—XI shown in FIG. 10.
Figure 12:
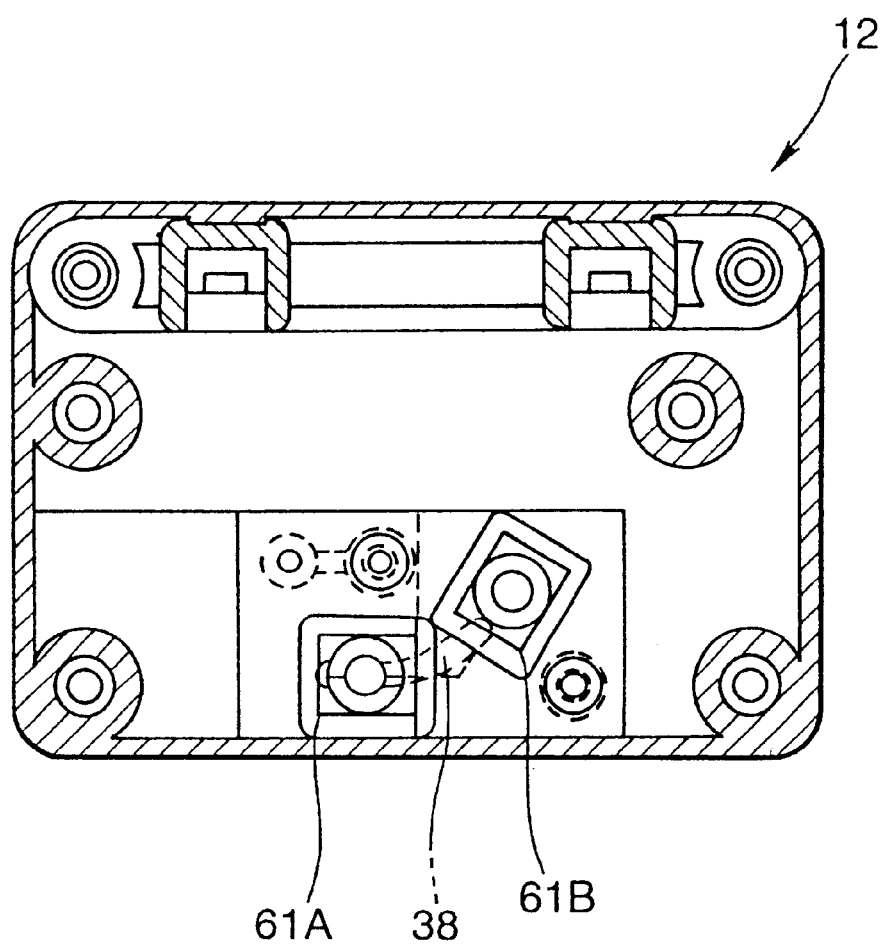
FIG. 12 is a cross section along line XII—XII shown in FIG. 10.
Figure 13:
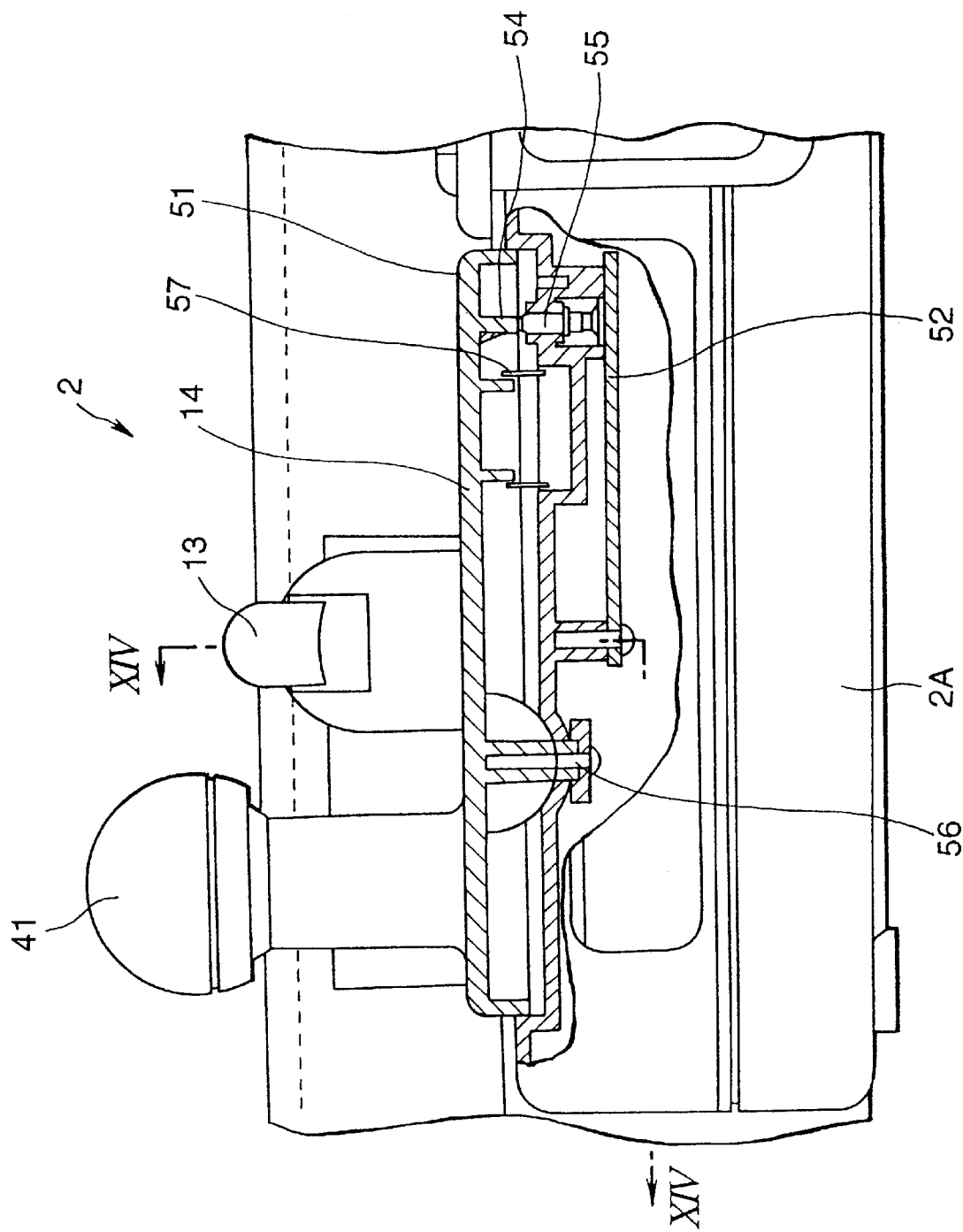
FIG. 13 is a front view near the faucet lever-shaped input device according to the embodiment of this invention, and a diagram showing the state where a portion thereof has been partially cut.
Figure 14:
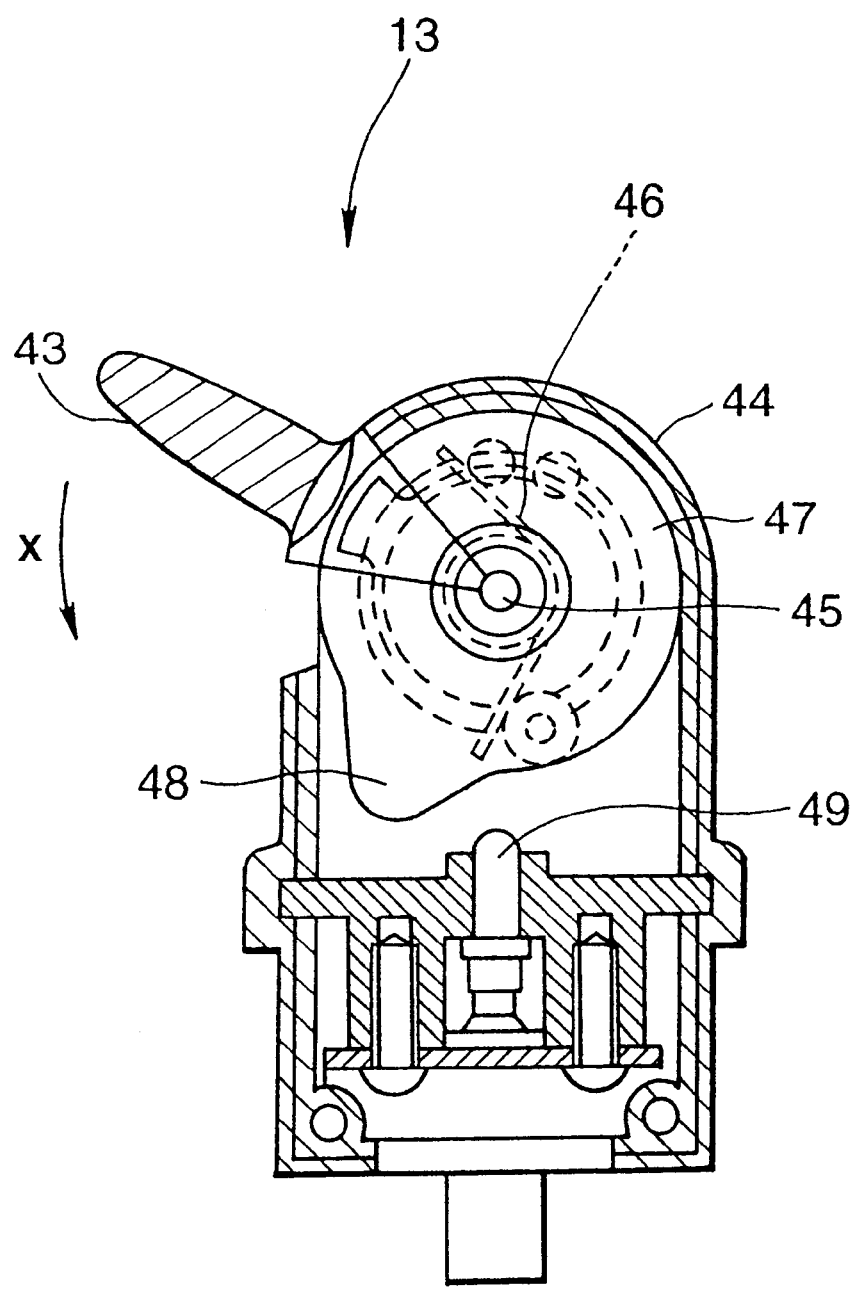
FIG. 14 is a cross section along line XN—XN shown in FIG. 13.
Figure 15:
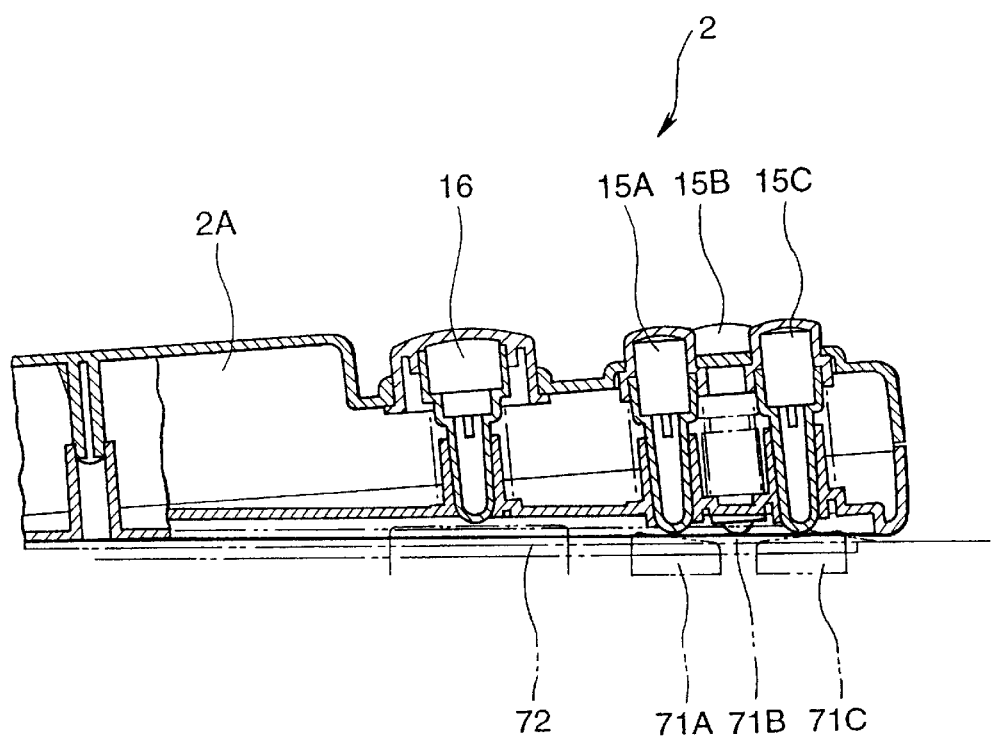
FIG. 15 is a cross section along line XV—XV shown in FIG. 3.
Figure 16:
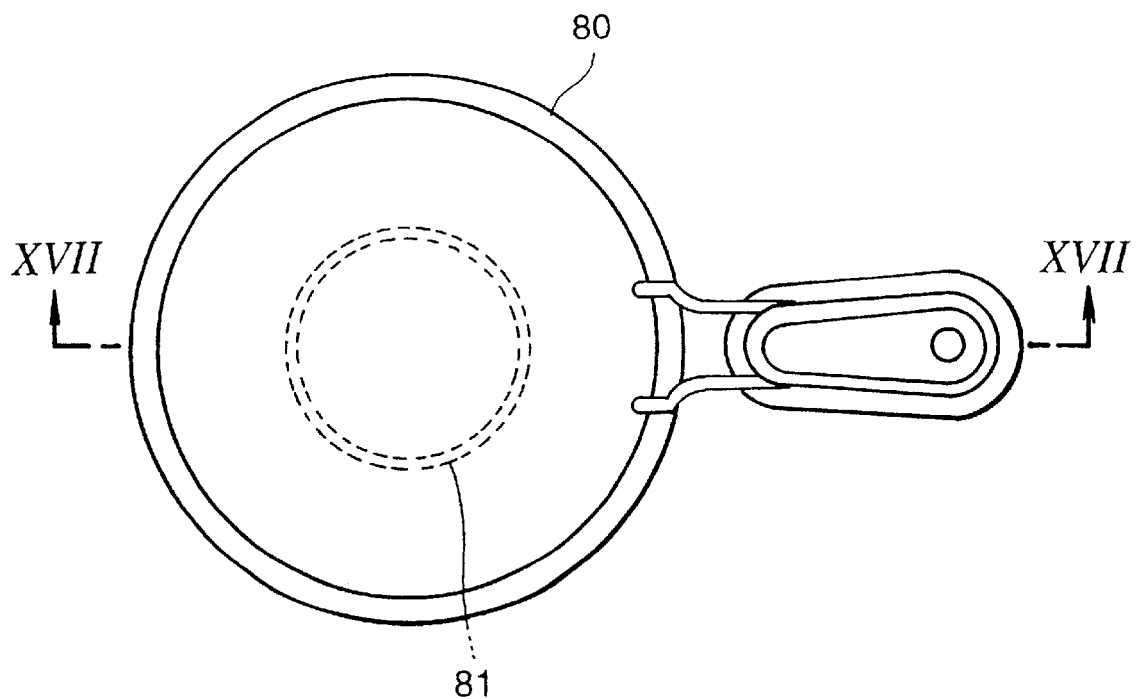
FIG. 16 is a plan view of the frying pan used with the audio or image processing system according to the embodiment of this invention.
Figure 17:
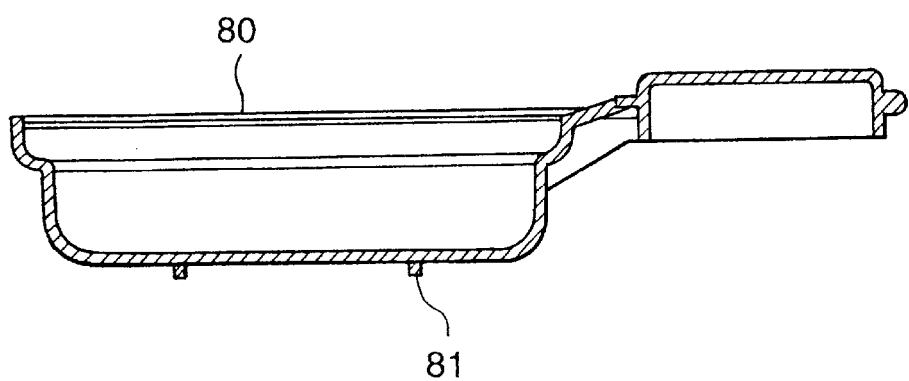
FIG. 17 is a cross section along line XVII—XVII shown in FIG. 16.

FIG. 1 is a perspective view showing the state where the audio or image processing device according to the embodiment of this invention is connected to the output playback device. FIG. 2 is a block diagram showing the state where the audio or image processing device according to the embodiment of this invention is connected to the output playback device. FIG. 3 is a plan view showing the input system according to the embodiment of this invention. FIG. 4 is a right side view of the input system of FIG. 3, FIG. 5 is a left side view of the input system of FIG. 3, and FIG. 6 is a front view of the input system of FIG. 3. FIG. 7 is a plan view showing the state where the burner grate of the burner-shaped input device according to the embodiment of this invention has been removed. FIG. 8 is a cross section along line VIII—VIII shown in FIG. 7. FIG. 9 is a cross section along line VN—VN shown in FIG. 7. FIG. 10 is a cross section along line X—X shown in FIG. 3. FIG. 11 is a cross section along line XI—XI shown in FIG. 10. FIG. 12 is a cross section along line XII—XII shown in FIG. 10. FIG. 13 is a front view near the faucet lever-shaped input device according to the embodiment of this invention, and a diagram showing the state where a portion thereof has been partially cut. FIG. 14 is a cross section along line XN—XN shown in FIG. 13. FIG. 15 is a cross section along line XV—XV shown in FIG. 3. FIG. 16 is a plan view of the frying pan used with the audio or image processing system according to the embodiment of this invention. FIG. 17 is a cross section along line XVII—XVII shown in FIG. 16.

As shown in FIGS. 1 to 15, the audio or image processing system 1 pertaining to the present embodiment comprises an input system 2 having arranged thereon integrally a plurality of input devices, and an audio or image processing device 3 for receiving input signals (data) from the input system 2, performing audio or image processing corresponding to the respective input devices based on such data, and outputting the result thereof to an output playback device 4.

Provided to the input system 2 are, on a single housing 2A, a burner-shaped input device 11 imitating a burner, burner control knob-shaped input device 12 imitating a knob for adjusting the heating power of the burner, faucet lever-shaped input device 13 imitating a faucet lever, cutting board-shaped input device 14 imitating a cutting board, selection button 15 composed of four different input buttons 15A, 15B, 15C, and 15D, decision button 16 for deciding the contents selected with the selection button 15, and input-pen holder 18 for holding an input pen 17.

The burner-shaped input device 11 is arranged on the deep right side of the housing 2A (cf. FIG. 3), and a burner switch 21 is provided to the center thereof which turns the device on when a cooking utensil such as a pot or frying is placed thereon and turns the device off when such cooking utensil is removed therefrom.

A ring-shaped convex portion 22 is provided around the burner switch 21, and provided to this convex portion 22 in approximate equal spaces are grates 22A, 22B, 22C, and 22D for placing a cooking utensil thereon. Vibration units 23A and 23B for vibrating the cooking utensil are provided between grates 22A and 22B, and between grates 22C and 22D, respectively.

As particularly shown in FIG. 9, the burner switch 21 has an approximate T-shaped cross section, and is supported movably by a base 27 to move up and down. This burner switch 21 is constantly urged in the upward direction by the urging force of a coil spring 26. The lower end of this burner switch 21 is connected to a switch main body 24 via a switch terminal 25. When the burner switch 21 is lowered by the weight of the cooking utensil placed thereon, the switch terminal 25 is pushed downward, and the switch main body 24 is turned on, Meanwhile, when the cooking utensil is removed, the burner switch 21 returns to its original position due to the urging force of the coil spring 26, and the switch main body 24 is turned off. Data showing this on/of f state of the switch main body 24 and the duration of such on/off state is input to a control circuit 5 of the audio or image processing device 3 explained later.

As this burner-shaped input device 11 is structured to conduct the on/off of the switch pursuant to the existence of a cooking utensil on the burner, virtual cooking maybe conducted in a realistic manner similar to actual cooking.

Formed between the inside of grates 22A, 22B, 22C, and 22D and the burner switch 21 is a ring-shaped groove 20 for engaging with a ring-shaped convex portion 81 formed on the outer bottom portion of the frying pan 80 (cf. FIGS. 16 and 17) explained later.

Vibration units 23A and 23B are connected to both ends of the base 28. This base 28 is structured to reciprocate with its center as the fulcrum, as shown in FIG. 8, pursuant to the coil spring 26 which expands and contracts by the rotation of a motor 29, and vibrates the vibration units 23A and 23B pursuant to such reciprocation.

The motor 29 is devised to vibrate the vibration units 23A and 23B by drive signals being input to the controller (not shown), which controls the drive of the motor 29, when a prescribed value is satisfied by the data input to the control circuit 5 of, the audio or image processing device 3 from a burner control knob-shaped input device 12 explained later.

As mentioned above, the burner-shaped input device 11 is structured to actually vibrate the vibration units 23A and 23B upon a cooking utensil such as a pot or frying pan being placed thereon and a fixed time elapsing. Thus, a more natural sound is produced as such cooking utensil is actually vibrated and sound is generated thereby. Further, as pots and frying pans actually vibrate during cooking, highly realistic and ambient virtual cooking is realized.

The burner control knob-shaped input device 12 is provided to the side of the proximal end (end facing the user) of the housing 2A. A heating power adjustment dial 31 is provided to the approximate center of this burner control knob-shaped input device 12. As particularly shown in FIG. 6, the heating power adjustment dial 31 is structured rotatably around a spindle 33 (shown in FIG. 10) so as to be capable of being set to the respective positions; namely, high 32A, low 32B, and off 32C, displayed on a front panel 31A.

Further, as particularly shown in FIG. 11, approximate semicircular grooves 34A, 34B, and 34C are formed on the bottom face of the heating power adjustment dial 31. A protrusion 38 for pressing switch buttons 61A and 61B shown in FIG. 12 is formed on the right side of groove 34A.

One end of an arm 36 is fixed to the back face of the base 35 supporting the front panel 31A. An approximate semicircular convex portion 36A for engaging with grooves 34A, 34B, and 34C is formed at the approximate center of the arm 36. On the other end of the arm 36, fixed is one end of a coil spring 37 in which the other end thereof is fixed to the back face of the base 35. This arm 36 is constantly urged downward by the coil spring 37. Pursuant to this urging force of the coil spring 37, prevented is the convex portion 36A disengaging from the respective grooves (34A, 34B and 34C) unless the heating power adjustment dial 31 is turned.

With respect to the burner control knob-shaped input device 12 having the aforementioned structure, when the heating power adjustment dial 31 is turned, for example, to be set to the low 32B position from the off 32C position, the arm 36 disengages from groove 34C against the urging force of the coil spring 37, and engages with groove 34B. Here, the protrusion 38 presses switch button 61B, and the signal representing that the heating power adjustment dial 31 is set to the low 32B position and the duration thereof are input to the control circuit 5 of the audio or image processing device 3 explained later. Moreover, when the heating power adjustment dial 31 is set to the high 32A position from the off 32C position, the protrusion 38 presses switch button 61A, and the signal representing that the heating power adjustment dial is set to the high 32A position and the duration thereof are input to the control circuit S. When the heating power adjustment dial 31 is set from low 32B to high 32A, or from high 32A to low 32B, similarly, signals representing such setting and the duration thereof are respectively input to the control circuit 5.

When data input to the control circuit 5 of the audio or image processing device 3 from the burner control knob-shaped input device 12 satisfies a prescribed condition, pursuant thereto, the aforementioned motor 29 is driven and the vibration units 23A and 23B are vibrated thereby.

As shown particularly in FIG. 3, the faucet lever-shaped input device 13 is arranged at the approximate center of the deep end of the housing 2A. A faucet body 41 of the water supply is arranged on the left side of the faucet lever-shaped input device 13. Further, a sink 42 is provided in front of the faucet lever-shaped input device 13 and the faucet body 41.

The faucet lever-shaped input device 13 comprises an operation lever 43 extending from a switch cover 44. The operation lever 43 is structured to rotate around the spindle 45 in the direction of arrow X shown in FIG. 14. Provided to the spindle 45 is a coil spring 46 for constantly urging the operation lever 43 upward. When a user pushed the operation lever 43 in the direction of arrow X and subsequently releases his/her hand therefrom, the coil spring 46 immediately returns the operation lever 43 to its original position. Thus, as the on/off of input of the faucet lever-shaped input device 13 is conducted by pushing the operation lever 43 downward in the direction of arrow X, the operation is simple.

A rotating plate 47, which rotates together with the spindle 45, is internally fixed to the switch cover 44 of the operation lever 43. A convex portion 48 is formed on the periphery of this rotating plate 47, moves pursuant to the rotation of the spindle 45 which rotates upon the operation lever 43 being pushed down in the direction of arrow X, and pushed up the switch button 49 provided internally to the switch cover 44. Further, when the user releases his/her hand and the operation lever 43 is returned to its original position, the switch button 49 also returns to its original position. The current state (if "on," such "on" state) of this switch button 49 is maintained until the next push down is made. This state and, if an "on" state, the elapsed time thereof are input to the control circuit 5 of the audio or image processing device 3 described later.

As shown particularly in FIG. 3, the cutting board-shaped input device 14 is arranged in front of the faucet lever-shaped input device 13 of the housing 2A; that is, in front of the sink 42. This cutting board-shaped input device 14, as specifically shown in FIG. 13, comprises a cutting board 51, and a supporting base 52 for supporting the cutting board 51 from thereunder. A concave portion 53, which acts as a guide for placing virtual ingredients thereon, is formed slightly left of center of this cutting board 51.

This cutting board 51 is further provided reciprocally to move up/down with the fulcrum 56 as the position displaced toward the left from the center thereof. A coil spring 57, which urges the cutting board 51 upward, is provided at a position displaced toward the right from the center of the bottom of this cutting board 51. The coil spring 57 plays the role of upwardly pushing the cutting board 51, which is pressed downward, and returning it to its original position.

Formed on the bottom right side of the cutting board 51 is a protrusion 54 for pressing the switch button 55 provided to the supporting base 52. In other words, this protrusion 54 is structured to press the switch button 55 upon the cutting board 51 reciprocating. The switch button 55 is turned on when pressed by the protrusion 54, and turned off when such pressing is released. The state of this switch button 55 and the intervals between the switching are input to the control circuit 5 of the audio or image processing device 3 explained later.

As mentioned above, as the fulcrum of reciprocation is slightly left of center in the cutting board 51, it is possible to prevent the switch button 55 from being pressed due to actions other than cutting the ingredient; for example, touching the center of the cutting board 51, placing the virtual ingredient on the concave portion 53, and a right-handed person accompanying his/her hand on the ingredient upon cutting the same with a toy knife, etc. Further, upon a right-handed person cutting the ingredient, he/she will lightly tap the right side of the cutting board 51 with a toy knife and the like. During this motion, the switch button 55 will be pressed by the protrusion 54 with certainty.

Although the fulcrum of reciprocation of the cutting board-shaped input device 14 is set slightly left of center as it is designed for a right-handed user, the fulcrum of reciprocation may be set slightly right of center if it is to be designed for a left-handed user.

The cutting board-shaped input device 14 is arranged at a lower position than that of the faucet lever-shaped input device 13. Thus, upon operating the faucet lever-shaped input device 13, it is possible to reduce the accidental operations of the cutting board-shaped input device 14. It is therefore possible to prevent erroneous signals from being input to the audio or image processing device 3 described later.

The selection button 15 is arranged at a position one step lower than that of the face where the burner-shaped input device 11, faucet lever-shaped input device 13, and cutting board-shaped input device 14 are arranged. The bottom ends of input buttons 15A, 15B, 15C, and 15D structuring the selection button 15 protrude from the bottom of the housing, and are capable of directly pressing input buttons 71A, 71B, 71C (and 71D, not shown) formed on the main body 100 of the audio or image processing device 3 explained later.

The decision button 16, similar to the selection button 15, is arranged at a position one step lower as mentioned above, and is capable of directly pressing the input button 72 formed on the main body 100 of the audio or image processing device described later.

As the selection buttons 15 and the decision button 16 are arranged at a position one step lower than that of the face where the burner-shaped input device 11, faucet lever-shaped input device 13, and cutting board-shaped input device 14 are arranged, upon operating the burner-shaped input device 11, faucet lever-shaped input device 13, or cutting board-shaped input device 14, it is possible to prevent the selection button 15 or the decision button 16 from being accidentally pressed. Further, upon operating the selection button 15 or the decision button 16, it is possible to prevent the burner-shaped input device 11, faucet lever-shaped input device 13, or cutting board-shaped input device from being accidentally pressed.

The input-pen holder 18 is also arranged at a position one step lower than the face where the burner-shaped input device 11, faucet lever-shaped input device 13, and cutting board-shaped input device 14 are arranged. This input-pen holder 18 stores the input pen 17 used upon designating a prescribed position of the setting unit 102 formed on the inside of the cover 101 of the audio or image processing device 3.

The housing 2A to which these input devices 11, 12, 13, 14, 15 and the input-pen holder are arranged is detachably fixed to the main body 100 of the audio or image processing device 3 pursuant to the fixing members 40A and 40B provided on both sides thereof.

A ring-shaped convex portion 81 is formed at the bottom periphery of the frying pan 80 shown in FIGS. 16 and 17. This convex portion 81 is structured to engage with the ring-shaped groove 20 formed on the burner-shaped input device 11. By the convex portion 81 and groove 20 becoming engaged, prevented is the frying pan 80 sliding or falling from the burner-shaped input device 11 when the frying pan is vibrated pursuant to the vibrations generated by the vibration units 23A and 23B.

As shown in FIG. 2, the audio or image processing device 3 receives signals output from the respective input devices 11, 12, 13, 14, 15, 16 and the setting unit 102 explained later, and comprises a control circuit 5 for performing desired processing, ROM (read-only-memory) 6 for developing programs pursuant to data input from the control circuit 5, and video circuit 7 and audio circuit 8 for converting the contents read from the ROM 6 into video signals and audio signals, respectively.

This audio or image processing device 3 further comprises a main body 100 for fixing the housing 2A to which the input system 2 is arranged, and a cover 101 provided to such main body 100. The main body 100 is electrically connected to the input system 2, and is structured such that the signal data input from the respective input devices 11, 12, 13, 14, 15, 16 and the setting unit 102 described later is input to the control circuit 5.

The setting unit 102 of the cover 101 is capable of holding a book 103 having drawings and characters accompanying the contents of the virtual cooking program. Here, when the user designates a desired position in the book 103 with the input pen 17, the coordinate data thereof is input to the control circuit 5. Further, a plurality of concave portions 105 are formed around the edge or the book 103, and provided to the setting unit 102 corresponding to these concave portions 105 is a detector 104 for detecting the page of the book 103 by detecting the light passing through such concave portions 105. The page data detected by this detector 104 is input to the control circuit 5.

As described above, the setting unit 102 on the inside of the cover 101 of the audio or image processing device 3 also plays the role of an input device.

Meanwhile, contents printed on the book 103 or information related thereto is assigned to the respective coordinates of the respective pages of the book 103, and stored. Contents concurring with the coordinate data and page data are read from the ROM 6, and the video circuit 7 and audio circuit 8 output video signals and audio signals to the display unit 9 and speaker 10 of the output playback device 4, respectively.

Further, contents based on data input from the respective input devices 11, 12, 13, 14, 15, 16 and the control circuit 5 are read from the ROM 6, and the video circuit 7 and audio circuit 8 output video signals and audio signals to the display unit 9 and speaker 10 of the output playback device 4, respectively.

In the present embodiment, the RCM 6 is provided at the lower end or the book 103, and the connector (not shown) of this ROM 6 is to be connected to the connector (not shown) provided at a prescribed position of the cover 101.

Next, specific operations of the audio or image processing system 1 according to the present embodiment are explained.

Foremost, described is a situation of playing a game of cooking desired virtual dishes using the audio or image processing system 1 according to this embodiment.

The input system 2 is set and electrically connected to the main body 100 of the audio or image processing device 3. Next, the book 103 provided with the ROM 6 is set to a prescribed position on the setting unit 102 of the cover 161 and the ROM 6 is electrically connected to the audio or image processing device 3. The audio or image processing device 3 is electrically connected to an output playback device 4 such as a TV.

Thereafter, when a desired menu to be prepared is clicked with the input pen 17 from the book 103, page data printed with such menu and the clicked coordinate data are input to the control circuit 5 from the setting unit 102. Contents conforming to both such data are read from the ROM 6, and the video circuit 7 and audio circuit 8 output video signals and audio signals to the display unit 9 and speaker 10 of the output playback device 4, respectively. Pursuant to this operation, the recipe of such menu is displayed on the output playback device 4 and verbal instructions are given thereby.

The user then begins the virtual cooking in accordance with the display and verbal instructions of the output playback device 4.

First, when instructions of washing the ingredient are given, the user pushes the operation lever 43 of the faucet lever-shaped input device 13 in the direction of arrow X shown in FIG. 14. Here, as the faucet lever-shaped input device 13 is arranged at a position higher than that of the cutting board-shaped input device 14 arranged in front thereof, it is possible to prevent erroneous operations of the cutting board-shaped input device 14. Pursuant to this action, the switch button 49 is pushed by the convex portion 48 of the rotating plate 47, and is turned on. Thereafter, although the coil spring 46 returns the operation lever 43 to its original position, the "on" state is maintained until the switch button 49 is subsequently pushed with the operation lever 43. This "on" signal is input to the control circuit 5; and via the ROM 6, video circuit 7, and audio circuit 8, a picture of water running from the faucet and the ingredient being washed by such water is displayed on the display unit 9 of the output playback device 4, and sounds of washing the ingredient are output from the speaker 10. Together with the picture and sound, the user, for example, may imitate washing the toy ingredient made of plastic and the like.

Here, the control circuit 5 measures the interval between the first signal showing the "on" state and input from the faucet lever-shaped input device 13, and a second signal (signal showing the "off" state) input subsequently, and outputs pictures and sounds to the output playback device in accordance therewith.

Specifically, if the interval between the first signal and second signal is short, a picture showing a small quantity of water running from the faucet is displayed, and if the interval is long, a picture showing a large quantity of running water is displayed. Further, if the aforementioned interval is of a moderate length, a picture showing a proper quantity of running water is displayed.

When a fixed time elapses, instructions to stop the water and finish the washing of ingredients are given, and in accordance with such instructions, the user pushes the operation lever 43 downward in the direction of arrow X shown in FIG. 14. Pursuant to such action, the switch button 49 is pushed by the convex portion 48 of the rotating plate 47, and is turned off. Here, this "off" signal is input to the control circuit 5, and the output playback device 4 suspends the picture of water running from the faucet and the sound thereof, and provides the user with subsequent instructions.

Next, when instructions are given for cutting the virtual ingredient washed during the aforementioned step, the user places this ingredient on the concave portion 53 formed slightly left of center of the cutting board 51 of the cutting board-shaped input device 14. This picture is displayed on the display unit 9 of the output playback device 4. The user, in accordance with the instructions, accompanies his/her hand on the ingredient for cutting such ingredient with a toy knife. Here, as the fulcrum of reciprocation of the cutting board 51 is at a position displaced to the left side from the center thereof, it is possible to prevent the cutting board 51 from reciprocating due to the aforementioned action. Thus, it is possible to prevent this type of signal, a so-called erroneous input, from being input to the control circuit S when the action of "cutting the ingredient" is not being conducted.

When the user taps the cutting board 51 with a toy knife to cut the ingredient, the cutting board 51 reciprocates based on such action, and the switch button 55 is pushed by the protrusion 54. When the switch button 55 is pushed, this signal is input to the control circuit 5. The control circuit 5 measures the interval (timing) between the first input signal which is input upon this switch button 55 being pushed, and the second signal input which is input upon the switch button 55 being pushed subsequently thereafter. The control circuit 5 performs processing for changing the size of the cut ingredient in accordance with this interval, reads relevant contents from the ROM 6 and, via the video circuit 7 and audio circuit a, outputs the picture and sound thereof to the output playback device 4. That is, in accordance with the aforementioned interval, the display of the way the ingredient is cut on the display unit 9 will change.

Specifically, for instance, the program is set such that if the user cuts the virtual ingredient with a toy knife (i.e., taps the cutting board 51) in interval s shorter than 2 seconds, the ingredient will be cut thin. If the interval is between 2 to 4 seconds, the virtual ingredient will be cut in an ordinary thick ness. If the interval is 4 seconds or longer, the ingredient will be cut thick. Therefore, it is possible to cook in a realistic manner.

Next, when instructions of frying the virtual ingredient with a frying pan are given, the user places the frying pan 80 on the burner-shaped input device 11. The burner switch 21 is pushed by the frying pan 80 being placed thereon, and the "on" signal is input to the control circuit 5 from the switch main body 24.

Thereafter, in accordance with the instructions given by the output playback device 4, the user turns and sets the heating power adjustment dial 31 of the burner control knob-shaped input device 12 to high 32A. Switch button 61A is therewith pushed by the protrusion 38 and this signal is input to the control circuit 5. The control circuit 5 measures the interval (timing) between the first signal which is input upon switch button 61A being pushed, and the second signal (e.g., signal of switch button 61B being pushed, or signal representing that the heating power adjustment dial 31 has been returned to off 32C) input subsequently thereafter.

The control circuit 5 performs processing for changing the thoroughness of cooking the ingredient in accordance with this interval, reads relevant contents from the ROM 6 and, via the video circuit 7 and audio circuit 8, outputs the picture and sound thereof to the output playback device 4. That is, in accordance with the aforementioned interval, the display of the way the ingredient is cooked on the display unit 9 will change.

Specifically, for example, if the heating power adjustment dial 31 remains at the position of high 32A, displayed is a picture where the ingredient is quickly burnt, and if the dial remains at the position of low 32B, much time will be required to thoroughly cook the ingredient. If the dial is not returned to the position of off 32C for a long period of time, displayed is a picture where the ingredient is burnt and reduced to ashes, whereas if the dial is returned to the position of off 32C too quickly, the ingredient will be cooked rare. Further, if the dial is appropriately switched between the positions of high 32A and low 32B, and remains there for a suitable amount of time, displayed is a picture of the dish cooked favorably; i.e., medium rare and the like.

During this action, if the frying pan 30 is raised from the burner-shaped input device 11, the burner switch 21 is returned to its original position, an "off" signal is input to the control circuit 5 from the switch main body 24, and a picture of the contents of the frying pan 80 being flipped over is displayed on the display unit 9. Even here, in accordance with the position of the aforementioned heating power adjustment dial 31 and the interval, displayed on the display unit 9 is a picture of the ingredient being flipped rare, burnt, or medium rare. If further heating the ingredient thereafter, the frying pan 80 is placed on the burner-shaped input device 11 once again.

Meanwhile, the control circuit 5 determines the position of the heating power adjustment dial 31 and measures 'the interval and, when a certain condition is fulfilled, drives the motor 29 by feeding the signal for driving the motor 29 to the motor controller not shown and vibrates the vibration units 23A and 23B.
The frying pan 80 placed on the burner-shaped input device 11 is thereby vibrated, and a natural sound is generated. Here, as a ring-shaped groove 20 is formed on the burner-shaped input device 11 and a convex portion 81 for engaging with such groove 80 is formed on the bottom of the frying pan 80, even if the frying pan 80 is vibrated, it is possible to prevent the frying pan 80 from sliding or falling from the burner-shaped input device 11.

Next, when seasoning the ingredient according to the instructions given by the output playback device 4, the user pushes input buttons 15A to 15D of the selection button 15 pursuant to such instructions. These input buttons 15A to 15D are respectively assigned seasonings; for example, salt, pepper, sugar, soy sauce, etc. The amount thereof to be used can be adjusted by the number of times such input buttons 15A to 15D are pushed.

After seasoning is finished, the output playback device 4 gives instructions to push the decision button 16. By pushing this decision button 16, the food is automatically dished up on the display unit 9, and the dish is completed.

Next, the audio or image processing device 3 executes a program for tasting the dish prepared with the aforementioned steps, and outputs the result to the output playback device 4. Here, the prepared dish is evaluated pursuant to the respective signals input to the control circuit 5 during the aforementioned cooking steps.

After tasting is completed, the audio or image processing device 3 executes a program for washing the dishes and instructions of cleanup are given by the output playback device 4. When the user pushes the operation lever 43 of the faucet lever-shaped input device 13 in accordance with such instructions, a picture of the dishes being washed is displayed on the display unit 9, and sounds thereof are generated from the speaker 10.

As mentioned above, with the audio or image processing system 1 according to the present embodiment, the user may comprehensively enjoy and learn cooking in general while following a series of actual cooking steps; such as washing, cutting, frying, boiling, seasoning, dishing up, and so on.

Moreover, if the user is able to perform the various steps correctly or well during cooking, the character displayed on the output playback device 4 may praise the user, whereas if the user is not able to perform the steps well, such character may encourage or provide advice to the user. This will provide a two-way learning experience to the user.

Although this embodiment described a case where the desired dish is prepared using all input devices, it is not limited thereto, and the audio or image processing system 1 of the present invention may use the respective input devices independently.

For example, upon boiling water with a pot using the burner-shaped input device 11, if the user designates the portion on the book 103 with the print of a burner (or a portion with a print of a character as a substitute therefor), the page data and coordinate data thereof are input to the control circuit 5, contents conforming to such data are read from the ROM 6 and, via the video circuit 7 and audio circuit 8, the picture and sound thereof are output to the output playback device 4.

Next, the user places the pot on the burner control-shaped input device 11 in accordance with the instructions of the output playback device 4. And when the heating power adjustment dial 31 of the burner control knob-shaped input device 12 is turned to a prescribed position (high 32A or low 32B), a while thereafter, a picture of the water in the pot beginning to boil is displayed on the output playback device 4. Here, the control circuit 5 determines the position of the heating power adjustment dial 31 and measures the interval of the signals and, when these results satisfy a certain condition, the vibration units 23A and 23B are vibrated as mentioned above in order to vibrate the pot, and a natural sound imitating the boiling of water is generated thereby. If a convex portion similar to the convex portion 81 formed on the bottom face of the frying pan 80 is also formed on the bottom face of the pot, the pot will not slide or fall from the burner-shaped input device 11 due to the vibration. After the water has boiled, the user sets the heating power adjustment dial 31 to the position of off 32C in accordance with the instructions of the output playback device 4, and turns the burner off.

Upon completing the aforementioned steps, for example, it is possible to produce a scene where the character displayed on the output playback device 4 is enjoying tea made with such boiled water.

Other than for washing ingredients and dishes, the faucet lever-shaped input device 13 may be used for pouring a prescribed amount of water into the pot. In this case also, the user designates with the input pen 17 the portion of the book 103 with the print of a faucet (or a portion with a print of a character as a substitute therefor), pushes the operation lever 43 of the faucet lever-shaped input device 13 in accordance with the instructions of the output playback device 4, and conducts the on/off of the switch button 49.

Similar to the above, if the user is able to measure the water correctly, the character displayed on the output playback device may praise the user for successfully measuring the water, or such character may encourage or provide advice to the user if he/she fails to measure the water correctly.

Further, with the cutting board-shaped input device 13, for example, a game of cutting a vegetable quickly may be played. In this game, the interval and frequency of the toy knife tapping the cutting board 51 are input to the control circuit 5, and the way the vegetable is cut and the speed thereof are evaluated based on such data. In this case also, the user designates with the input pen 17 a portion of the book 103 with the print of a cutting board (or a portion with a print of a character as a substitute therefor), and performs the steps in accordance with the instructions of the output playback device 4.

Needless to say, the audio or image processing system according to the present invention, in addition to the aforementioned embodiment, may also be used for virtual cooking pursuant to an arbitrary combination of arbitrary input devices.

Furthermore, the layout of the respective input devices described in the present embodiment is one example, and it goes without saying that the layout may be changed so as long as the functions of the respective input devices are not hindered.

Moreover, this embodiment described a case of providing a concave portion to the burner-shaped input device and providing a convex portion for engaging with such concave portion to the bottom face of the cooking utensil so as to prevent such utensil from slipping or falling from the burner-shaped input device even if the vibration units are vibrated. Nevertheless, it is not limited thereto and may be of a structure where a convex portion is provided to the burner-shaped input device and a concave portion is provided to the cooking utensil, or combinations of an engaging member and reception having a different shape may also be employed.

As described above, the audio or image processing system according to the present invention comprises a plurality of input devices for respectively conducting different forms of virtual cooking, and an audio or image processing device for performing audio or image processing corresponding to the respective input devices based on data input therefrom and outputting the result thereof to an output playback device. Thus, virtual cooking progresses pursuant to the data input by the user, and he/she may pleasantly conduct two-way virtual cooking conforming to actual cooking in accordance with pictures displayed on and sound generated from the output playback device. As a result thereof, a child may comprehensibly enjoy and learn cooking in general while following the cooking steps. Further, if data is input from only one input device, independent virtual cooking such as washing, cutting, boiling, frying, etc. may be conducted in accordance with the respective input devices.

What is claimed is:

1. An audio or image processing system to be used for playing a game of virtual cooking, comprising:
   a plurality of input devices for respectively conducting different forms of virtual cooking; and
   an audio or image processing device for performing audio or image processing corresponding to said respective input devices based on data input therefrom and outputting a result thereof to an output playback device.

2. An audio or image processing system according to claim 1, wherein said audio or image processing device performs said audio or image processing in accordance with an interval between a first signal input from said respective input devices and a second signal input subsequent to said first signal.

3. An audio or image processing system according to claim 2, wherein at least one of said plurality of input devices comprises a vibration mechanism for generating vibrations based on the interval of said first signal and second signal.

4. An audio or image processing system according to claim 3, wherein the input device comprising said vibration mechanism is a burner-shaped input device imitating a burner, and in addition to providing said vibration to cooking utensil placed thereon, it conducts an on/off of input pursuant to existence of said cooking utensil and maintains said "on" state while said cooking utensil is placed thereon.

5. An audio or image processing system according to claim 4, wherein the input device comprising said vibration mechanism has an engaging member for engaging with said cooking utensil, and a reception for engaging with said engaging member is formed on said cooking utensil.

6. An audio or image processing system according to claim 4, wherein either said engaging member or said reception is formed of a concave portion, while the other is formed of a convex portion.

7. An audio or image processing system according to claim 6, wherein the input device with a displaced fulcrum of input is a cutting board-shaped input device imitating a cutting board, and a concave portion is formed in an approximate center of an upper surface thereof for indicating a position of placing an ingredient.

8. An audio or image processing system according to claim 7, wherein said audio or image processing device controls a cutting style of the ingredients of virtual cooking in accordance with the interval between the first signal and second signal input from said cutting board-shaped input device.

9. An audio or image processing system according to claim 8, further comprising:
   a recording medium for realizing the audio or image processing system.

10. An audio or image processing system according to claim 4, further comprising:
    a recording medium for realizing the audio or image processing system.

11. An audio or image processing system according to claim 3, further comprising:
    a recording medium for realizing the audio or image processing system.

12. An audio or image processing system according to claim 1, wherein one of said plurality of input devices is a faucet lever-shaped input device imitating a faucet lever for discharging and stopping water of a virtual water supply.

13. An audio or image processing system according to claim 12, wherein said faucet lever-shaped input device comprises an urging member for urging the lever in a reverse direction to that of an input operation direction so as to return the lever an the original position after each input operation.

14. An audio or image processing system according to claim 12 or claim 13, wherein said faucet lever-shaped input device is arranged behind said cutting board-shaped input device and placed in a position higher than that of said cutting board-shaped input device.

15. An audio or image processing system according to claim 12 or claim 13, wherein said audio or image processing device controls the amount of water of the virtual water supply in accordance with the interval between the first signal and second signal input from said faucet lever-shaped input device.

16. An audio or image processing system according to claim 15, further comprising:
    a recording medium for realizing the audio or image processing system.

17. An audio or image processing system according to claim 1, wherein one of said plurality of input devices changes input signals in stages.

18. An audio or image processing system according to claim 17, wherein said input device for changing input signals in stages controls the vibration of the input device comprising said vibration mechanism.

19. An audio or image processing system according to claim 17 or claim 11, wherein said input device for changing input signals in stages is a burner control knob-shaped input device imitating a knob for adjusting heating power of said virtual burner.

20. An audio or image processing system according to claim 19, wherein said audio or image processing device controls thoroughness of cooking the ingredients of virtual cooking in accordance with the interval between the first signal and second signal input from said burner control knob-shaped input device.

21. An audio or image processing system according to claim 20, further comprising:

a recording medium for realizing the audio or image processing system.

22. An audio or image processing system according to claim 1 or claim 2, wherein said respective input devices are arranged integrally and at least two of the input devices are arranged to be at different heights in order to avoid input operations to the respective input devices from interfering with each other.

23. An audio or image processing system according to claim 22, wherein said respective input devices are integrally arranged on one virtual kitchen table, and said virtual kitchen table is attachable to and detachable from said audio or image processing device.

24. An input system according to claim 22, wherein one of said respective input devices is arranged in a single housing.

25. An audio or image processing system according to claim 1, wherein one of said plurality of input devices is structured of a selection button for selecting contents of a menu displayed on said output playback device, and a decision button for deciding the contents selected with said selection button.

26. An audio or image processing system according to claim 25, wherein said selection button and decision button are arranged at a lower position than that of said burner-shaped input device, said cutting board-shaped input device, and said faucet lever-shaped input device.

27. An audio or image processing system according to claim 1, wherein one of said plurality of input devices is arranged in a position where a fulcrum of input is displaced from the center thereof.

28. An audio or image processing system according to claim 1, wherein said respective input devices are integrally arranged on one virtual kitchen table, and said virtual kitchen table is attachable to and detachable from said audio or image processing device.

29. An input system according to claim 1, wherein one of said respective input devices is arranged in a single housing.

30. An audio or image processing system according to claim 1, further comprising:

a recording medium for realizing the audio or image processing system.

31. A peripheral of an audio or image processing system to be used for playing a game of virtual cooking comprising:

an input device and an audio or image processing device for performing audio or image processing corresponding to said respective input devices based on data input therefrom and outputting a result thereof to an output playback device; and wherein said input device comprises a shape imitating a burner, conducts on/off input pursuant to an existence of a cooking utensil, and inputs data corresponding to s time said cooking utensil is placed on said burner to said audio or image processing device.

32. A peripheral according to claim 31 further comprising:

a vibration mechanism for generating vibrations corresponding to the time said cooking utensil is placed on said burner.

33. A peripheral according to claim 31 or claim 32 further comprising a second input device for inputting signals for adjusting heating power of said virtual burner.

34. A peripheral of an audio or image processing system to be used for playing a game of virtual cooking comprising:

an input device, and an audio or image processing device for performing audio or image processing corresponding to said respective input devices based on data input therefrom and outputting the result therefrom to an output playback device; and wherein said input device comprises a shape imitating a cutting board and is arranged in a position where a fulcrum of input is displaced from a center thereof.

35. A peripheral of an audio or image processing system to be used for playing a game of virtual cooking comprising an input device, and an audio or image processing device for performing audio or image processing corresponding to said respective input devices based on data input therefrom and outputting the result thereof to an output playback device, wherein said input device comprises a shape imitating a faucet lever for discharging and stopping water of a virtual water supply and has an urging member for urging the lever in a reverse direction to that of an input operation direction so as to return the lever to an original position after each input operation.

36. An audio or image processing system comprising:

an overall input device having arranged thereon a plurality of input devices capable of inputting in different forms;

an audio or image processing device for performing audio or image processing corresponding to the respective input devices based on data input therefrom and outputting a result thereof to an output playback device; and wherein with respect to said overall input device, said plurality of input devices are arranged in a row facing in front of an operator, and the input devices on a distal end of the operator is formed at a position higher than that of the input devices on a proximal end of the operator.

* * * * *